No. 813,659. PATENTED FEB. 27, 1906.
S. P. MILLS.
WHEEL HUB.
APPLICATION FILED JUNE 30, 1905.

Witnesses
E. F. Stewart
C. N. Woodward

Silas P. Mills, Inventor.
by C. A. Snow & Co.
Attorneys

UNITED STATES PATENT OFFICE.

SILAS PARKS MILLS, OF GARFIELD, KANSAS.

WHEEL-HUB.

No. 813,659.  Specification of Letters Patent.  Patented Feb. 27, 1906.

Application filed June 30, 1905. Serial No. 267,797.

*To all whom it may concern:*

Be it known that I, SILAS PARKS MILLS, a citizen of the United States, residing at Garfield, in the county of Pawnee and State of Kansas, have invented a new and useful Wheel-Hub, of which the following is a specification.

This invention relates to improvements in vehicle-wheel hubs and axle-bearings, and has for its object to improve the construction and increase the facilities for lubricating the same.

With these and other objects in view the present invention consists in the combination and arrangement of parts, as will be hereinafter fully described, shown in the accompanying drawings, and particularly pointed out in the appended claims.

Figure 1:
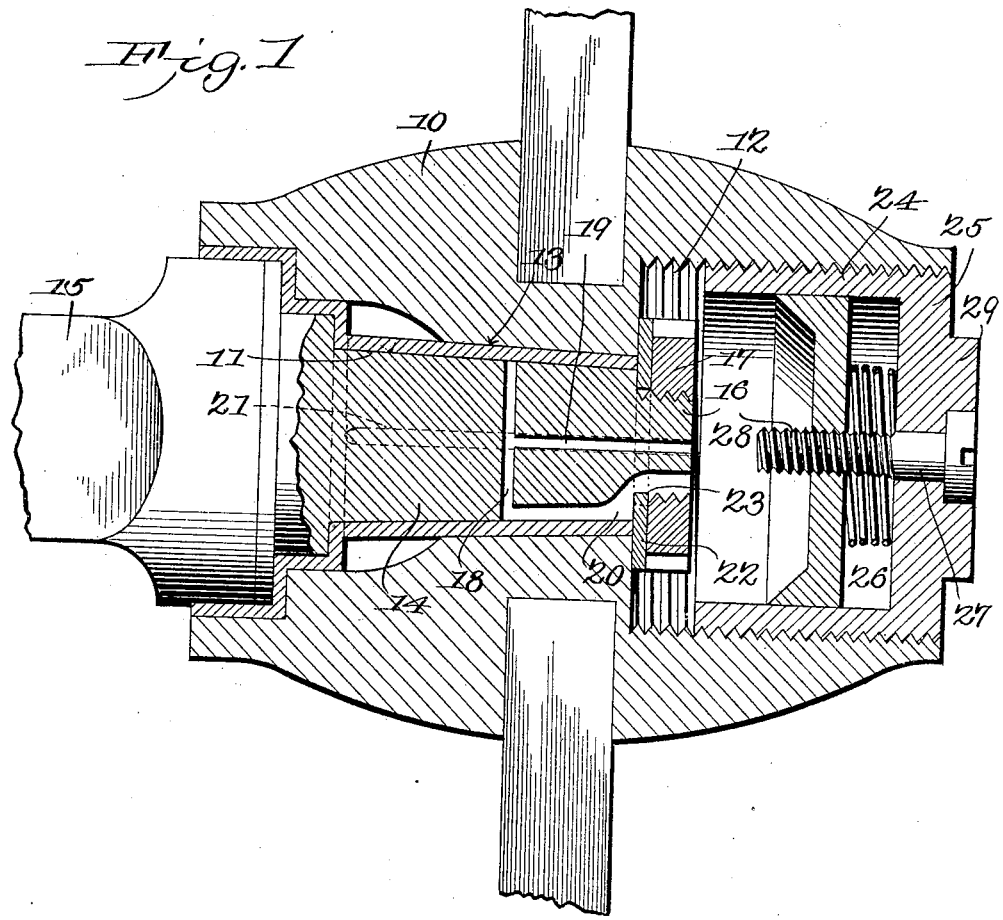
Figure 2:
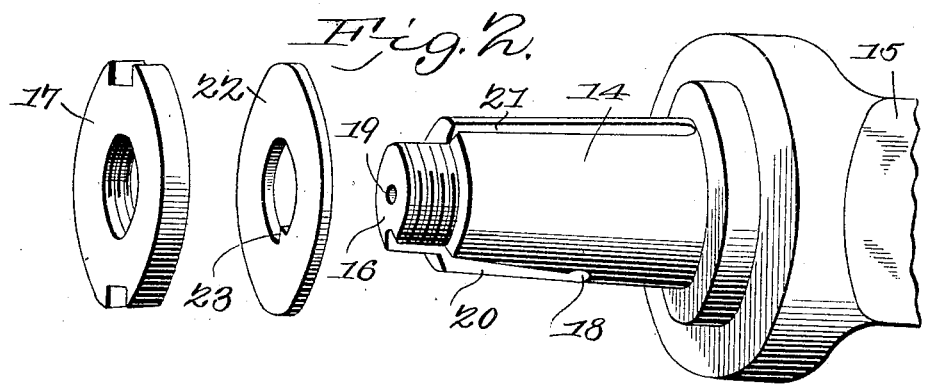

In the drawings, Figure 1 is a longitudinal sectional elevation of a wheel-hub and one of the axle-spindles with the improvements embodied therein. Fig. 2 are perspective views of one of the axle-spindles and one of the washers and axle-nuts detached.

In the improved device is comprised a hub 10, having an axle-bearing 11 in the inner end and a chamber 12 in the outer end, the chamber being internally threaded and communicating with the bearing. The bearing 11 is provided with a "skein" 13 of the usual form when the device is applied to ordinary wooden hubs. The spindle portion 14 of the axle 15 is shorter than ordinary to correspond to and engage the shortened bearing and skein and with its outer end threaded, as at 16, and supplied with a nut 17, bearing against the body of the hub at the inner end of the chamber 12. The spindle portion 14 of the axle is provided with an intermediate transverse oil-duct 18, and leading inwardly through the center of the spindle is an oil-duct 19, intersecting the transverse duct, as shown in Fig. 1. Formed in the outer portion of the spindle 14 is a longitudinal channel 20, connected at one end into one end of the transverse duct 18 and extending transversely of the threaded end 16 of the spindle. By this means the oil will freely flow through the ducts 19 and 18 from the chamber 12, and any surplus oil will flow back again into the chamber through the channel 20.

The channel 20 will be located in the bottom side of the spindle, while the duct 18 will be maintained in a vertical position, as shown, and to still further cause the uniform distribution of the oil a longitudinal channel 21 is formed in the spindle, preferably "quartering" to the channel 20 or at one side of the spindle.

A binding or "jam" washer 22 is disposed on the threaded end of the spindle and with an inwardly-extending lug 23 for bearing in the channel 20 to prevent the rotation of the washer, but not large enough to cut off the flow of the oil. The stationary washer thus serves as a lock to the nut 17 and prevents its retrograde movement.

Inserted into the threaded end of the chamber 12 is an externally-threaded cylindrical member 24, closed at the outer end, as at 25, and with a spring 26 between the plunger and said closed outer end.

A bolt 27 is rotatively disposed through the outer end 25 of the cylindrical member and engaging the plunger by its threaded inner end 28. By this simple means it is obvious that the plunger may be moved longitudinally of the cylindrical member by rotating the bolt 27, and by withdrawing the plunger to the limit of its movement outwardly, which may be done by simply rotating the bolt by a screw-driver or like implement from the exterior of the hub, and filling the chamber with oil the latter may be forcibly fed to the spindle, as will be obvious, by rotating the screw to cause the forward movement of the plunger. It will also be obvious that any desired quantity of the lubricant may be supplied and easily governed by the action of the bolt. The spring thus acts to maintain the plunger in its inward position and also holds the head of the bolt oil-tight against the end 25 of the member 24. The member 25 is also provided with an extension 29 to receive a wrench for the removal and insertion of the member 24.

The member 14 may be of any required length to adapt the axle to strains to which it will be subjected.

I claim—

1. A wheel-hub having an axle-bearing in the inner end and an internally-threaded cavity in the outer end communicating with said bearing, an axle-spindle engaging said bearing and having a threaded terminal, an axle-nut engaging the threaded end of said spindle and bearing against the hub in the bottom of said cavity, a threaded cylindrical member closed at the outer end and engaging said cavity, a plunger operating in said cylinder, and means for moving said plunger longitudinally of said cylinder.

2. A wheel-hub having an axle-bearing in the inner end and an internally-threaded cavity in the outer end communicating with said bearing, an axle-spindle engaging said bearing and having a threaded terminal, and with an intermediate transverse aperture and a central longitudinal aperture leading inwardly from the outer end and intersecting said transverse aperture.

3. A wheel-hub having an axle-bearing in the inner end and an internally-threaded cavity in the outer end communicating with said bearing, an axle-spindle engaging said bearing and having a threaded terminal, an intermediate transverse aperture and a central longitudinal aperture leading inwardly from the outer end and intersecting the transverse aperture and a longitudinal channel connecting one of the outer ends of said transverse aperture with said cavity.

4. A wheel-hub having an axle-bearing in the inner end and an internally-threaded cavity in the outer end communicating with said bearing, an axle-spindle engaging said bearing and having a threaded terminal, an axle-nut engaging the threaded end of said spindle and bearing against the hub in the bottom of said cavity, a threaded cylindrical member closed at the outer end and engaging said cavity, a plunger operating in said cylinder, and a bolt rotative through the closed end of said cylindrical member and engaging said plunger by its threaded end.

5. A wheel-hub having an axle-bearing in the inner end and an internally-threaded cavity in the outer end communicating with said bearing, an axle-spindle engaging said bearing and having a threaded terminal, an axle-nut engaging the threaded end of said spindle and bearing against the hub in the bottom of said cavity, a threaded cylindrical member closed at the outer end and engaging said cavity, a plunger operating in said cylinder, a bolt rotative through said cylindrical member and engaging said plunger by its threaded end, and a spring between said plunger and the outer end of said cylindrical member.

In testimony that I claim the foregoing as my own I have hereto affixed my signature in the presence of two witnesses.

SILAS PARKS MILLS.

Witnesses:
  JOHN S. OLSON,
  D. B. WOLCOTT.